April 8, 1930.  W. G. JONES  1,754,212
AUTOMATIC GEAR SHIFT
Filed Oct. 19, 1928  2 Sheets-Sheet 1
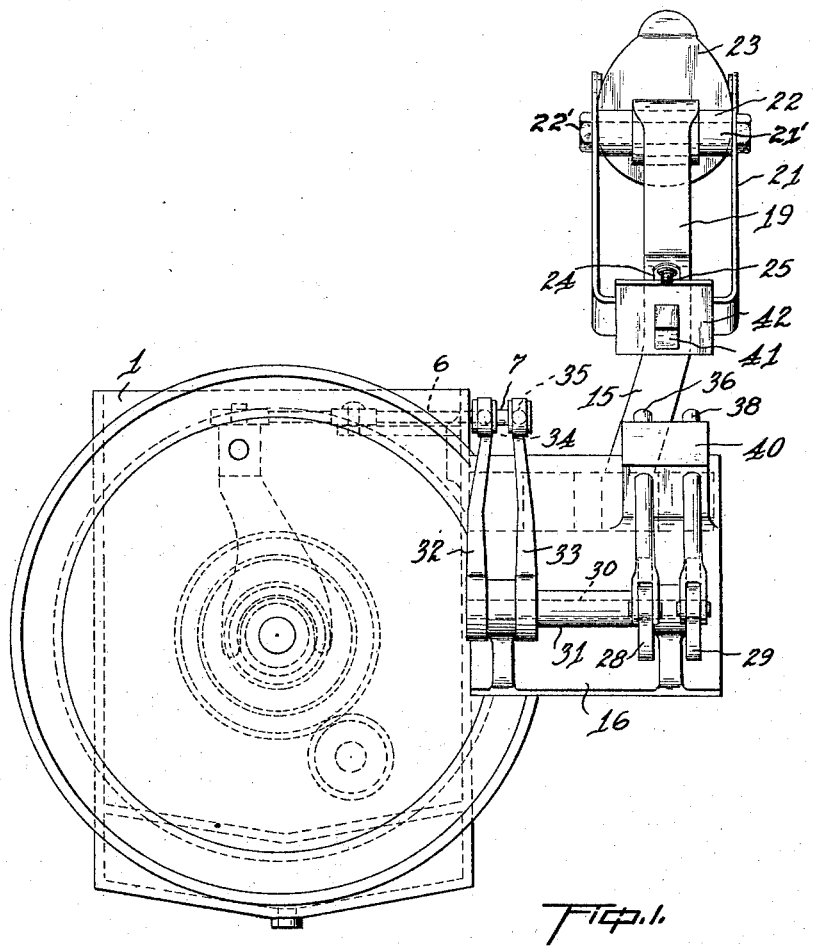
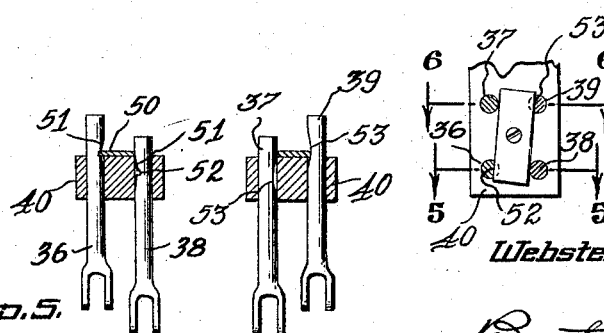
Inventor
Webster G. Jones
By
Attorneys

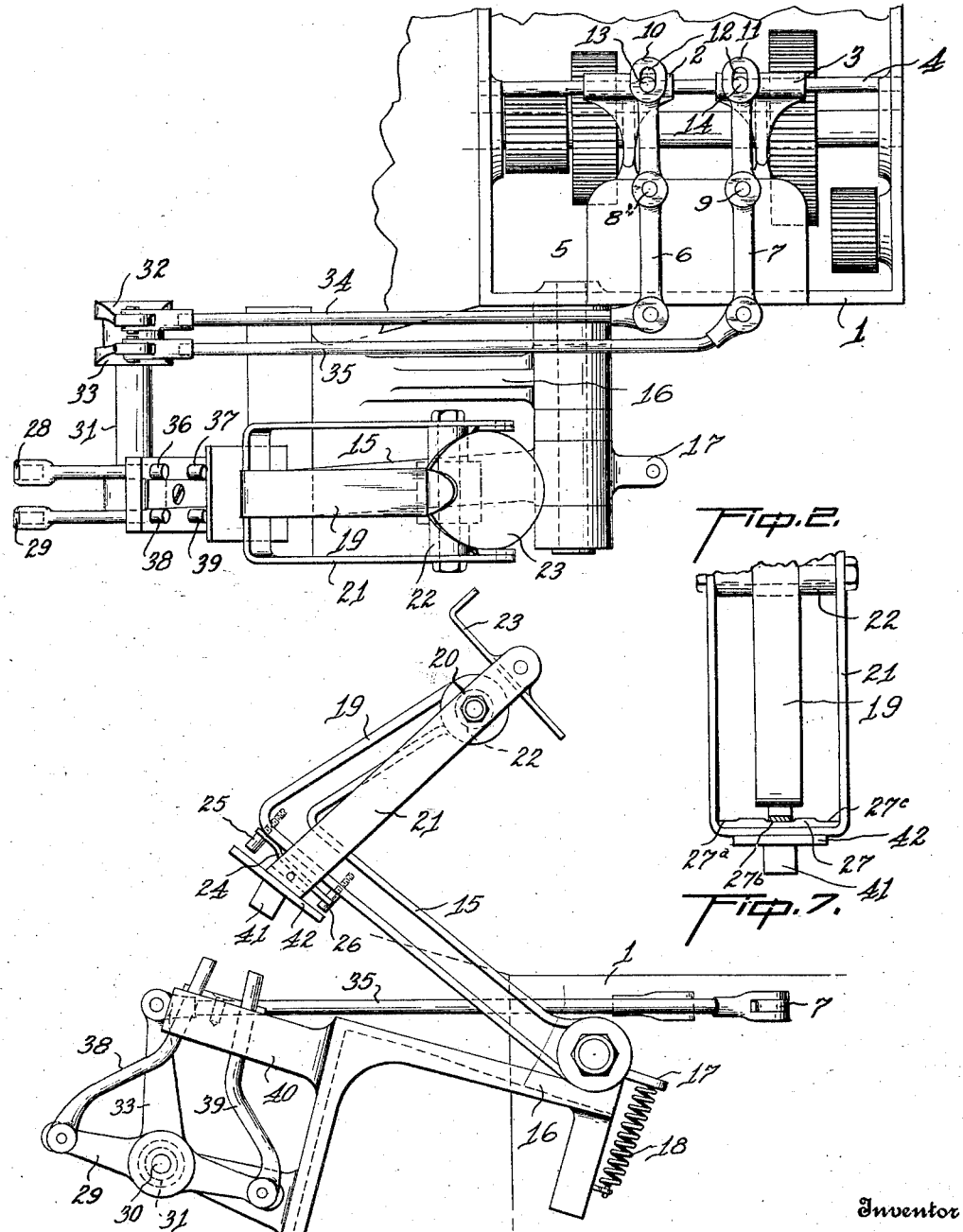

Patented Apr. 8, 1930

1,754,212

UNITED STATES PATENT OFFICE

WEBSTER G. JONES, OF DETROIT, MICHIGAN

AUTOMATIC GEAR SHIFT

Application filed October 19, 1928. Serial No. 313,441.

The present invention pertains to a novel mechanism for shifting gears in automobiles and like vehicles employing interchangeable sliding gears for the transmission of power at a multiplicity of speeds.

The primary object of the present invention is to increase the space in the driving compartment of an automobile or like vehicle by eliminating the use of the customary gear shifting lever and substituting a more simplified structure which selects the gears to give the desired speed and move the gear into the driving position. The present device is actuated by the foot in operating the clutch pedal, thereby leaving both hands of the operator free to manipulate the steering wheel and lessening the difficulties found in driving an automobile.

A further object of the present invention is to construct a device which is operated by the clutch pedal, for attachment upon the transmission of a motor vehicle having sliding drive gears giving a multiplicity of speeds forward and one reverse, whereby the gear giving the desired speed may be moved into a driving position in a manner greatly simplified in comparison to the method commonly employed. The commonly known, hand operated "wobble stick" is entirely eliminated, the gears being shifted by the foot in operating the clutch pedal.

With these objects in view, and others subsidiary thereto or resultant therefrom, my invention is fully disclosed in the following description with reference to the accompanying drawings, in which Figure 1 is a front elevation of the present gear shifting device equipped upon the transmission casing of an automobile;

Figure 2 is a top plan view of the present invention showing the cover of the transmission casing removed;

Figure 3 is a side elevation of the present device equipped upon an automobile transmission casing;

Figure 4 is a detailed view of the locking mechanism which prevents the clashing of gears occasioned by meshing two gears of different speeds at the same time;

Figure 5 is a cross section on the line 5—5 of Fig. 4;

Figure 6 is a cross section on the line 6—6 of Fig. 4, and

Figure 7 is a detailed view of the mechanism which indicates to the operator which gear the device will move into driving position.

In the drawings the numeral 1 indicates the transmission casing of an automobile, enclosing the conventional sliding gears which give the multiplicity of speeds to the vehicle, the gears being adapted for manipulation in the usual method by the forks 2 and 3 which are slidable longitudinally upon the rod 4, the latter also being mounted in the transmission casing. The transmission casing is further provided with an inwardly extending shelf-like flange 5, providing a means of support for pivoting the levers 6 and 7 as at 8 and 9 respectively, the ends 10 and 11 of the levers being provided with slots 12 which engage pintles 13 and 14 on the forks 2 and 3 whereby movement of the levers 6 or 7 imparts movement to the fork 2 or 3.

The above described mechanism is illustrative of one of the several different types of sliding gear transmissions which may be actuated by the present device through the attachment upon the clutch pedal 15 which is pivoted upon a bracket 16 attached to the exterior of the transmission casing. The clutch pedal is provided with the angularly extending portion 19 which follows the usual practice in clutch pedal design, the upper end being of special design in so far as it is formed into a bearing aperture 20 which supports a clevis 21 by means of a bolt 21' surrounded by a sleeve 22, the bolt 21' extending through the opposite arms of the clevis and the sleeve 22 acting as a spacer for said arms and permitting nuts 22' to be drawn tight on the bolt 21' to provide a pivotal mounting for said clevis. As will be observed in the drawings, the arms of the clevis are spaced a greater distance than the width of the clutch pedal by the sleeve 22 and the clevis is supported by the sleeve in passing through the bearing aperture 20 in a manner which permits the clevis 21 to be moved transversely on the sleeve 22 in relation to the portion 19 of the clutch pedal as well as permitting it to be tilted forwardly or rearwardly, the different movements being imparted through the foot-piece 23, secured to the arms of the clevis at their upper extremities and above the pivoting bolt 21'.

The clevis supporting assembly is clearly illustrated in Figure 1 of the drawings which shows the bolt 21' of small diameter passing from one arm of the clevis to the other, and surrounding this bolt 21', shown by dotted lines, is the sleeve 22. The sleeve 22 passes from one side of the clevis to the other and passes through the pedal 19, the pedal being provided with the bearing aperture 20 which corresponds in diameter to the outer diameter of the sleeve 22.

The bolt may have a head on one end which engages the outside of one of the arms forming the clevis and a nut received on the other end which projects beyond the other arm of the clevis or it may be provided with removable nuts 22' on each end. The sleeve 22 which surrounds the bolt 21' between the two arms of the clevis acts as a spacer between the arms of the latter and permits the nuts 22' on the bolt 21' to be tightly drawn against the arms of the clevis without changing their spaced relation.

The assembly, which comprises a bolt and a sleeve, could be quite readily made in one piece by providing shoulders on a bolt which would serve as a spacer in the same manner the sleeve does. This is purely a matter of convenience in assembly for if the bolt was made in one piece it would be impossible to assemble them together without springing the upper ends of the arms of the clevis apart which would slow up the assembly considerably.

A spring 24 is secured to the pedal 16 by the screw 25 and is maintained in position by the screw 26 which is partly surrounded by a forked end of the spring, the screws 25 and 26 in addition to this purpose are employed to limit the pivotal movement of the clevis 21 when it is tilted forwardly or rearwardly upon the bolt 22. The clevis carries a gear locating member 27 which is provided with indentations 27$^a$, 27$^b$ and 27$^c$, the member is positioned so that the spring 24 will engage on one of the indentations and tend to maintain the clevis in a stationary position, the mechanism being clearly illustrated in Figure 7 of the drawings. The object of the locating member is to notify the operator when the clevis is in a certain position and maintain it in this position without positively locking it, the mechanism being operable by exerting sufficient pressure to overcome the pressure of the spring.

The bracket 16 carries a pair of rockers 28 and 29, the rocker 29 being supported upon a shaft 30 and the rocker 28 being supported upon a sleeve 31 which surrounds the shaft 30, the shaft and sleeve being carried in bearings provided upon the bracket 16 carrying the levers 32 and 33 respectively. The levers 32 and 33 are pivotally connected to the previously described levers 6 and 7 by the links 34 and 35 respectively and for the purpose of moving the gears by imparting movement to one of the rockers 28 or 29, the movement being imparted through pins 36, 37, 38 and 39 connected to the rockers. The pins are connected at opposite ends of the rockers and extend upwardly, curving to pass through a pin guide extension arm 40 formed upon the bracket 16, the guide holding the pins in a position where they may be actuated by the contact of a stud 41 carried by a plate 42 attached to the lower portion of the clevis.

The operation of the device in moving the gears which will give the driving connection known as first or low, is to move the foot member transversely until the spring 24 engages in the indentation 27$^a$ in the member 27, the foot piece is then tilted rearwardly in a manner corresponding to moving the ordinary gear shift lever into low, the movement bringing the stud 41 directly over the pin 38. The mechanism when in the above described position moves the gear into position by the lowering of the clutch pedal to release the clutch, the lowering causing the stud 41 to force the pin 38 downwardly and rock the rocker 29 and the shaft 30 and impart motion to the fork 2 through the arm 32, the link 34 and the pivoted lever 6.

Through the above described operation it becomes apparent that the device may be manipulated to engage any desired pin and move any desired gear into place. The manner in which the pins are attached to rockers causes one pin to raise every time one is caused to lower which makes it necessary that means should be provided to move all the pins to the same level and thereby cause the gears to assume a neutral position. The pins are all moved to the same level by moving the foot member 23 so that the spring 24 engages in the indentation 27$^b$, the clutch pedal is then lowered, the stud 41 passing between the pins 26, 27, 28 and 29 and allowing the plate 42 to contact with all the pins and if one is in a raised position it is moved to neutral by continued pressure upon the clutch pedal.

To make the device fool proof and to prevent clashing of gears caused by movement of the opposite gears when one gear is already in driving mesh, a locking device is provided for the pins which consists of a plate 50 pivoted upon the extension 40 of the bracket 16. One of the pins on each rocker 28 and 29, the drawing illustrating the pins 36 and 38, is provided with a tapered portion 51 and a recess 52, the taper causing the plate 50 to be moved into the recess 52 in the pin 36 when the pin 38 is lowered and maintains it in the recess until the pin 36 is moved to a position where all the pins are a level height or in a neutral position. The opposite pins 37 and 39 are recessed as at 53, as clearly indicated in Fig. 6, to permit the plate 50 to swing upon its pivot as above described.

Although a specific embodiment of my invention has been illustrated and described, it is apparent that various alterations may be made in the details of construction without departing from the spirit of the invention as depicted in the following claims.

What I claim is:

1. In a gear shifting mechanism, a sliding gear transmission enclosed in a casing, a plurality of upwardly extending pins, connecting means from said pins to said gears whereby movement of one of said pins causes one of said gears to be moved to a driving position, and a clevis pivotally mounted upon a foot pedal and adapted to slide longitudinally on its pivot for selectively engaging said pins whereby movement of said foot pedal causes a selected gear to be moved into a driving position.

2. In a gear shifting mechanism, a sliding gear transmission enclosed in a casing, a plurality of upwardly extending pins, connecting means from said pins to said gears whereby movement of one of said pins causes one of said gears to be moved to a driving position, a clevis movably mounted upon a foot pedal and having means for selectively engaging said pins whereby movement of said foot pedal causes a selected gear to be moved into a driving position, and means operated by movement of any one of said pins to positively lock the other of said pins from movement.

3. In a gear shifting mechanism, a sliding gear transmission enclosed in a casing, a plurality of upwardly extending pins, connecting means from said pins to said gears whereby movement of one of said pins causes one of said gears to be moved to a driving position, a clevis movably mounted upon a foot pedal and having means for selectively engaging said pins whereby movement of said foot pedal causes a selected gear to be moved into a driving position, and a plate carried by said clevis for exerting pressure upon all of said pins whereby to move the gears to a neutral position.

4. In a gear shifting mechanism, a sliding gear transmission, a plurality of upwardly extending pins, connecting means from said pins to said gears whereby movement of one of said pins causes one of said gears to be moved to a driving position, a clevis pivotally mounted upon a foot pedal and adapted to slide longitudinally upon its pivot for selectively engaging said pins whereby movement of said foot pedal causes a selected gear to be moved into a driving position, and means operated by movement of any one of said pins to positively lock the other of said pins from movement.

5. In a gear shifting mechanism, a sliding gear transmission, a plurality of upwardly extending pins, connecting means from said pins to said gears whereby movement of one of said pins causes one of said gears to be moved to a driving position, a clevis pivotally mounted upon a foot pedal and adapted to slide longitudinally upon its pivot for selectively engaging said pins whereby movement of said foot pedal causes a selected gear to be moved into a driving position, means operated by movement of any one of said pins to positively lock the other of said pins from movement, and a plate carried by said clevis for exerting pressure upon all of said pins whereby to move the gears to a neutral position.

6. In a gear shifting mechanism, a sliding gear transmission enclosed in a casing, a plurality of upwardly extending pins, connecting means from said pins to said gears whereby movement of one of said pins causes one of said gears to be moved to a driving position, a clevis movably mounted upon a foot pedal and having means for selectively engaging said pins whereby movement of said foot pedal causes a selected gear to be moved into a driving position, means operated by movement of any one of said pins to positively lock the other of said pins from movement, and a plate carried by said clevis for exerting pressure upon all of said pins whereby to move the gears to a neutral position.

In testimony whereof I affix my signature.

WEBSTER G. JONES.